United States Patent [19]

Härtel et al.

[11] 4,377,998
[45] Mar. 29, 1983

[54] METHOD AND APPARATUS FOR VARYING THE SPACING OF SEQUENTIAL IGNITION CONTROL PULSES EMITTED BY AN IGNITION PULSE TRANSDUCER

[75] Inventors: Günter Härtel, Neuss; Manfred Henning, Kaarst, both of Fed. Rep. of Germany

[73] Assignee: Bosch und Pierburg System OHG, Fed. Rep. of Germany

[21] Appl. No.: 214,067

[22] Filed: Dec. 8, 1980

[30] Foreign Application Priority Data

Dec. 7, 1979 [DE] Fed. Rep. of Germany ....... 2949307

[51] Int. Cl.³ .......................... F02P 5/04; F02D 5/00; F02B 3/00; F02P 1/00
[52] U.S. Cl. .................................. 123/418; 123/419; 123/406
[58] Field of Search ............... 123/419, 425, 436, 426, 123/421, 422, 423, 424, 418, 406, 416, 417, 427

[56] References Cited

U.S. PATENT DOCUMENTS

| | | | |
|---|---|---|---|
| 3,789,816 | 2/1974 | Taplin et al. | 123/436 |
| 4,099,493 | 7/1978 | Latsch et al. | 123/436 |
| 4,134,374 | 1/1979 | Latsch et al. | 123/436 |
| 4,201,163 | 5/1980 | Hattori et al. | 123/418 |

FOREIGN PATENT DOCUMENTS

| | | | |
|---|---|---|---|
| 54-142420 | 11/1979 | Japan | 123/406 |
| 54-142424 | 11/1979 | Japan | 123/406 |
| 715818 | 2/1980 | U.S.S.R. | 123/406 |

*Primary Examiner*—Raymond A. Nelli
*Attorney, Agent, or Firm*—Edwin E. Greigg

[57] ABSTRACT

A method for varying the phase spacing of sequential ignition control pulses emitted by an ignition pulse transducer and an apparatus for performing the method are proposed, wherein it is ascertained in the case of the sequential ignition pulses whether their phase spacing has become shorter. If a shortening of the phase spacing is ascertained, then the ascertained phase difference, or a maximal value of the phase difference, is added to the phase spacing of the ignition pulse at that particular time. In this manner, jerking which occurs particularly at constant rpm, when internal combustion engines with externally-supplied ignition used to operate a motor vehicle are driven in the vicinity of the idling rpm, is avoided by simple means.

19 Claims, 6 Drawing Figures

4,377,998

METHOD AND APPARATUS FOR VARYING THE SPACING OF SEQUENTIAL IGNITION CONTROL PULSES EMITTED BY AN IGNITION PULSE TRANSDUCER

BACKGROUND OF THE INVENTION

The invention relates to a method and apparatus for varying the spacing of sequential ignition control puses emitted by an ignition pulse transducer.

In order to operate internal combustion engines with fuel-air mixtures which have been made so lean that the engine is operating in the vicinity of the lean running limits, it is known to regulate the instant of ignition in accordance with an idling roughness signal in such a way that a degree of quiet idling of the engine is maintained which is considered as barely permissible (German Offenlegungsschrift, i.e., laid-open application No. 25 10 526 which corresponds to U.S. Pat. No. 4,178,891.

Apparatuses for obtaining an engine roughness signal are also known in which a phase control circuit is used, with the aid of which an average constant rpm is formed from the actual rpm representing the degree of engine roughness, and the engine roughness signal is generated from the phase difference between the two rpm (German Offenlegungsschrift, i.e., laid-open application No. 24 34 743 which corresponds to U.S. Pat. No. 4,153,013).

It is also known, in order to vary the instant of injection over the entire operational range of an engine, to provide a phase delay circuit located between a voltage-controlled oscillator and the phase comparison circuit of a phase control circuit; the delay period of this phase delay circuit is then variable in accordance with operating parameters of the engine. In this arrangement, the signal emitted by an ignition angle transducer is present at the input of the phase comparison circuit, and is delivered to the ignition device of the engine via the voltage-controlled oscillator. However, with this apparatus only a phase advance of the control signal picked up at the voltage-controlled oscillator, compared with the control signal emitted by the ignition angle transducer, can be obtained (German Offenlegungsschrift laid-open application No. 27 08 245).

ADVANTAGES OF THE INVENTION

According to the present invention the phase spacing of the sequential ignition control pulses emitted by an ignition pulse transducer is varied so that whenever a shortening of the phase spacing is ascertained, the phase spacing is prolonged by the addition of a maximal phase difference amount or by means of the measured phase difference, so long as this measured phase difference is smaller than the maximal phase difference.

The method and apparatus according to the present invention has the advantage over the prior art that with very simple means it is possible to avoid jerking which substantially occurs under constant driving conditions and at low rpm and is caused by thermodynamic influences and dynamic influences of the gear mechanism of the vehicle being driven with the internal combustion engine under consideration.

As a result of the characteristics disclosed in the dependent claims, advantageous modifications of and improvements to the apparatus for performing the method according to the main claim are provided.

The invention will be better understood and further objects and advantages thereof will become more apparent from the ensuing detailed description of two preferred embodiments taken in conjunction with the drawings.

DESCRIPTION OF THE EXEMPLARY EMBODIMENTS

Figure 1:
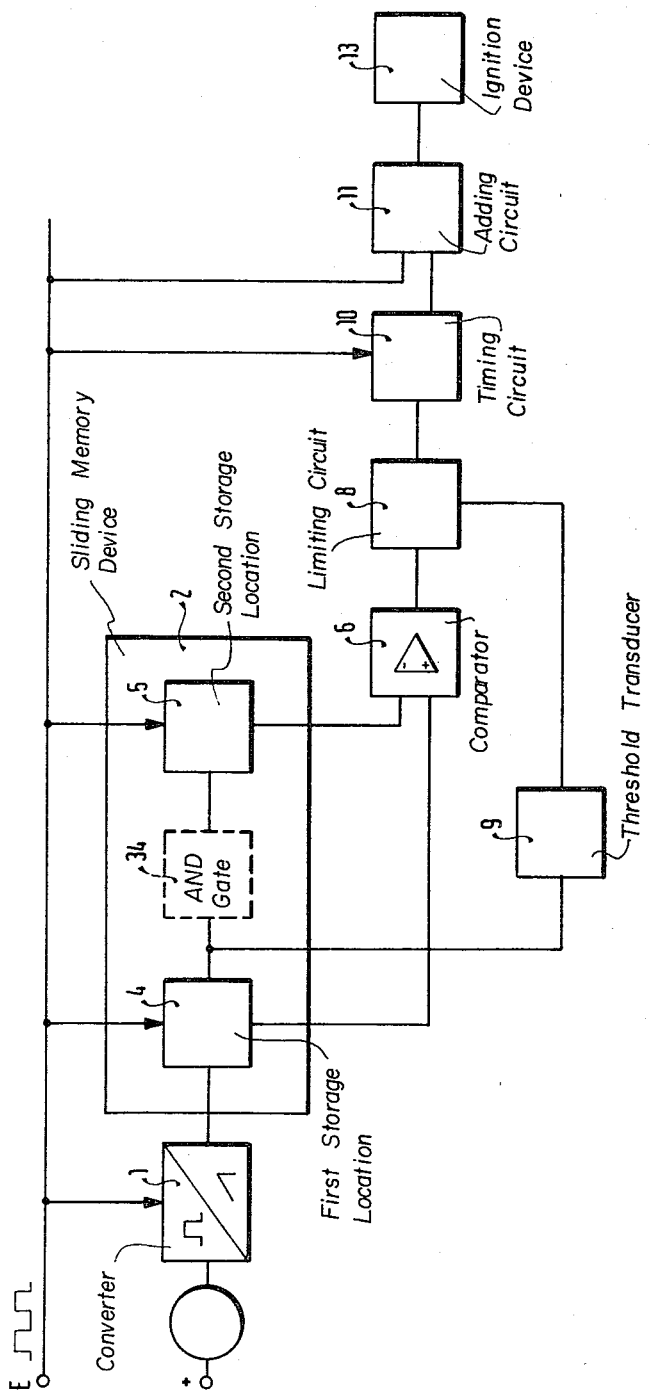
FIG. 1 shows a functional plan for the first exemplary embodiment.

In the solution according to the invention, it is assumed that rectangular pulses are generated in an rpm-synchronous sequence by an ignition pulse transducer which is not shown, these signals being delivered for control purposes to an ignition device (which again is not shown) in which a high-voltage pulse is generated, and then delivered to the appropriate ignition location. The apparatus for varying the spacing of the sequential ignition control pulses is now provided between the ignition device and the ignition pulse transducer.

The ignition control pulses present at input E control a converter 1, in which the phase spacing of the sequential ignition control pulses is converted into a voltage proportional thereto. The output of the converter 1 is connected with a sliding memory device 2, which has a first storage location 4 and a second storage location 5, each being controlled by edges of the ignition control pulses. The first storage location 4, which immediately follows the converter 1, is connected with the first input of a comparator device 6, and the second storage location 5 is connected with the other input of the comparator device 6. The output of the comparator device is connected with a limitation circuit 8, which is triggered by a threshold transducer 9. The threshold transducer 9 has its input connected with the output of the first storage location 4.

The output of the limitation circuit 8 leads to a timing circuit 10, which is triggered by the control pulses present at input E, and which serves to form a delay pulse of length $\Delta\alpha$ corresponding to the output value of the limitation circuit 8. The output of the timing circuit 10 leads to a first input of an adding circuit 11, whose other input is connected with the circuit input E and from there obtains the ignition control pulses. The output of the adding circuit 11 is connected with the ignition device 13 of the engine.

Figure 2:
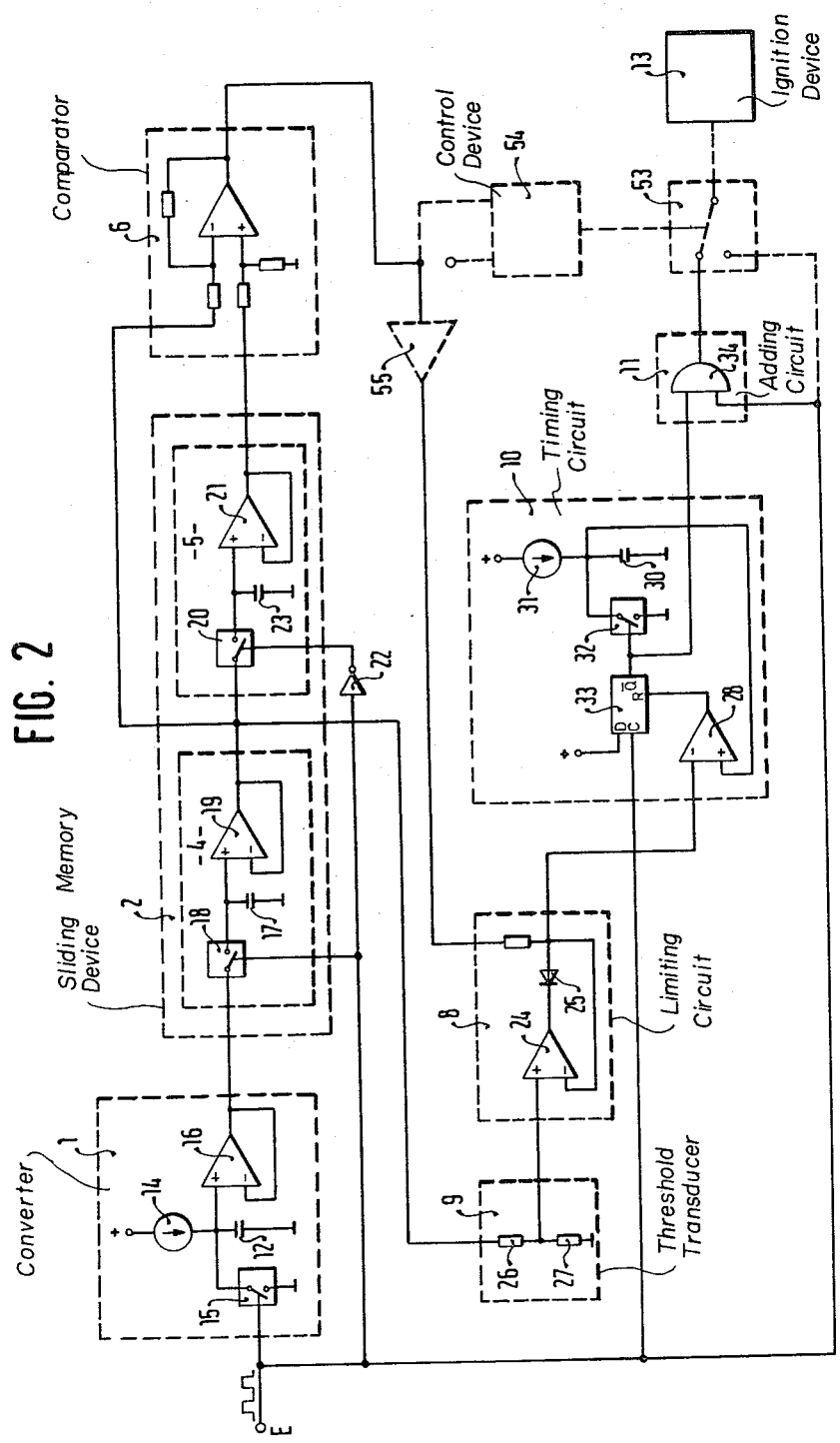
FIG. 2 is a circuit diagram in principle of the first exemplary embodiment.

From the illustration of the principle of the apparatus given in FIG. 2, it can be seen that the converter 1 has a capacitor 12 acting as a memory, which is disposed between a current source 14 and ground. A switch 15 is provided parallel to the capacitor 12, which closes when there is a positive control signal and thus causes discharging of the capacitor 12. The voltage status of the capacitor is delivered to the sliding memory device 2 via an impedance converter 16. The first storage location 4 of this memory device 2 comprises in turn a capacitor 17 connected to ground, whose terminal is connected via switch 18 with the output of the converter 1. Like the switch 15, the switch 18 is controlled by the ignition control pulses present at input E and closes when there is a positive signal. The voltage status of the capacitor 17 is carried in turn via an impedance converter 19 to the output of the storage location and from there to the identically designed second storage location having a capacitor 23, a switch 20 and an impedance converter 21. The switch 20 of the second storage location side is likewise controlled by the control pulses from input E; however, an inverter 22 is interposed in this case, so that the switch 20 is opened when there is a positive voltage at input E.

The comparator device 6 comprises a differential amplifier, at whose inverting input the output signal of the first storage location 4 is present and at whose noninverting input the output signal of the second storage location side is present. The limitation device following the comparator device 6 comprises a differential amplifier 24, at the output of which diode 25 which is polarized in the blocking direction is present. The anode of this diode 25 is connected with the output of the comparator device 6 and with the inverting input of the differential amplifier 24 is connected with the threshold transducer 9, which comprises a voltage divider having the resistors 26 and 27, which are located between the output of the first storage location 4 and of the sliding memory device 2 and ground.

The anode of the diode 25, as an output connection of the limitation circuit 8, is connected with the inverting input of a comparator 28, which is a component of the timing circuit 10. This timing circuit 10 substantially comprises a capacitor 30 connected to ground, whose terminal is connected with a current source 31. A switch 32 is connected to ground parallel to the capacitor 30, and when there is a positive trigger signal it closes and discharges the capacitor 30. The switch 32 is controlled by the inverting output of a D flip-flop 33. This output Q simultaneously represents the output of the timing circuit 10 and is connected with the adding circuit 11. On the input side, the D flip-flop 33 has its clock input connected with the input E and it is subjected to the ignition control pulse train. The D input is at a fixed, positive value.

Between the current source 31 and the capacitor 30, a connection leads to the non-inverting input of the comparator 28, whose output is connected with the reset input of the D flip-flop 33.

The adding circuit 11 is made up of an AND gate, whose first input is connected with the output of the timing circuit 10 and whose other input is subjected to the ignition control pulses from input E.

Figure 3:
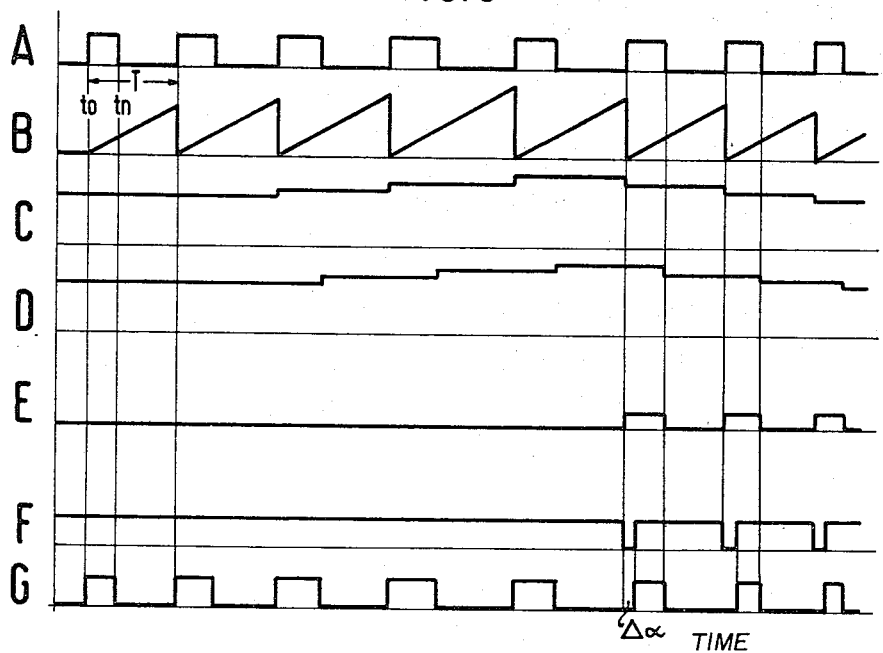
FIG. 3 gives associated pulse diagrams for the individual functional locations of the first exemplary embodiment.

The function of the described circuit will now be explained with the aid of the pulse diagrams given in FIG. 3. Diagram A represents the rectangular pulse train furnished to input E by the ignition pulse transducer. These ignition control pulses have a positive edge at time $t_o$ and a negative edge at time $t_n$. In accordance with the phase spacing T of the positive edges of the ignition control pulses, a sawtooth voltage is generated in the converter 1 in accordance with Diagram B. Whenever there is a positive edge, the memory device of the converter is erased so that the peak value for the voltage increase attained at that time represents a standard for the phase spacing T.

Diagram C shows the voltage status of the capacitor 17 of the first storage location 4. Whenever there is a positive edge, the peak value of the sawtooth voltage of the converter 1 is assumed. In the present case, the charging status at first increases in accordance with a decreasing rpm, and then decreases whenever the rpm increase.

Diagram D illustrates the charging status of the capacitor 19 of the second memory device. This memory device assumes the charging state of the first memory device when there is a negative edge. Diagram E illustrates the voltage present at the output of the comparator device 6. As long as the rpm is dropping, that is, as long as the charging status in the second storage location is lower than the charging status in the first storage location, a signal 0 appears at the output of the comparator device. As soon as the phase spacing of a subsequent ignition control pulse is reduced, and the voltage status of the second memory device is larger than that of the first memory device, then a voltage signal appears at the output of the comparator device which corresponds to the difference in phase spacing.

This signal is delivered to the limitation circuit 8, which obtains the threshold from the threshold transducer 9. In the limitation circuit, the output signal of the comparator device 6 is limited to the threshold value arriving from the threshold transducer 9. Values below this value are transmitted further, unchanged, to the timing circuit 10. There, with each positive edge of the ignition control pulses, the flip-flop is set, so that the inverted signal 0 appears at the output $\overline{Q}$.

In accordance with this signal, the switch 32 is opened, so that the capacitor 30 can gradually charge vai the current source 31. The charging status of the capacitor 30 is monitored by means of the comparator 28. As soon as the charging status exceeds the voltage value $U = f(\Delta\alpha)$ furnished to the comparator by the limitation circuit 8, then a signal appears at the output of the comparator 28 which resets the D flip-flop, so that a positive signal, which closes the switch 32, appears at the output $\overline{Q}$ and the capacitor 30 is discharged. The reversing time of the D flip-flop determines a negative pulse of pulse length $\Delta\alpha$, which is delivered to the input of the AND gate 34 of the adding circuit. These pulses are shown in Diagram F. Addition with ignition control pulses shown in Diagram A produces a phase delay with a corrected pulses train as shown in Diagram G, by the amount of the negative pulse $\Delta\alpha$.

Thus it is ascertained with the described apparatus whether a shortening of the phase spacing, corresponding to an increase in rpm, from a first, preceeding ignition control pulse to a second, subsequent ignition control pulse is present. This shortening is again compensate for by a corresponding prolongation by the amount of $\Delta\alpha$, generated in the timing circuit 10; thus it is possible to maintain an ignition pulse train having a constant frequency as long as the increase in rpm does not exceed the maximal amount of phase displacement which is intended to be maintained with the limitation circuit. Small, brief variations in the ignition instant within a range of dispersion of approximately 5° of crankshaft angle are thus compensated for by means of this circuit, and thus it is possible to avoid jerking which might occur at constant rpm in the operational range of the engine which is in the vicinity of the idling range. This jerking is for the most part caused by the fluctuations in the effective average pressure during the individual strokes of the engine.

Because the output voltage at the comparator device 6 is a time-dependent signal, and rpm compensation is provided in the apparatus for performing the method according to the invention in terms of at least maximum amount of adjustment determined by the limiting circuit 8. As described, the threshold transducer 9 receives its voltage from the output of the first storage location 4, which has an rpm-dependent voltage level.

Alternately, as shown by broken lines in FIG. 7, a memory or a low-pass filter 34 can be disposed preceding the second storage location 5. As a result of this memory or low-pass filter, it is possible to form an average value from the individual voltage values emitted by the first storage location 4. In this case, then the phase difference among the particular actual values present in the first storage location is formed into an average value for the phase spacing by means of the comparator device 6.

In a supplementary embodiment, the output of the adding circuit 11 is connected to the first input of a switchover device 53, which is provided between the adding circuit 11 and the ignition device 13. The other input of the switchover device 53 is connected with input E, so that, depending upon the switching position of the switchover device the ignition device 13 receives the corrected or the non-corrected ignition control pulses. The switchover device 53 is actuated by a control device 54, in which the momentary rpm change is compared with a threshold value, $$\frac{\Delta n}{n \text{ average}}$$

or an analog value with the aid of a comparator device. If the threshold is exceeded, the switchover device 53 is switched in such a manner that the ignition device 13 is connected with the input E. The control device 54 can be connected for this purpose with the output of the comparator device 6, from once which it receives the actual signal for the rpm change. The threshold value can be derived from the voltage supplied to the threshold transducer 9.

With this supplementary embodiment, a loss in power or an increase in fuel consumption, which might occur in the case of severe changes in rpm or during acceleration, is avoided as the result of a correction in the instant of injection.

In order to make the correction of the instant of injection more effective, the signal emitted by the comparator device 6 can be amplified by a factor K, which is suggested by the amplifier 55 indicated in FIG. 9 in broken lines and which is located in the junction between the comparator device 6 and the limitation circuit 8. The amplification factor of the amplifier may be varied in accordance with operation parameters.

Figure 4:
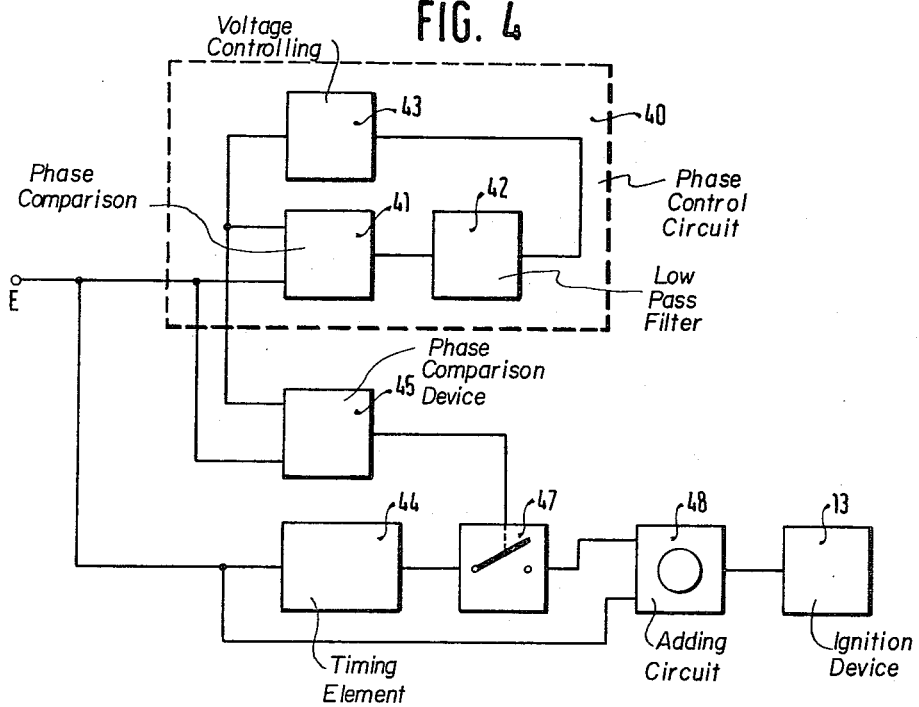
FIG. 4 is a functional plan for the second exemplary embodiment.

The second exemplary embodiment according to FIG. 4 also has an input E which is connected with an ignition pulse transducer and is exposed to rectangular pulses. The input E is connected with the first input of a phase comparison device 41 of a phase control circuit 40. The output of the phase comparison device leads by way of low-pass filter 42 to the other input of the phase comparison device 41. The output of the voltage-controlled oscillator is also connected with a first input of a second phase comparison device 45, whose output leads to a switching device 47. The switching device 47 controls the connection between a timing element 44, which is triggered by the ignition control pulses present at the input E, and an adding circuit 48. The other input of the adding circuit is connected with input E, while the output leads to the ignition device 13, which is not shown in detail here.

With the aid of the phase control circuit, an averaged frequency is formed, in a known manner, from the actual frequency of the ignition control pulses, and this averaged frequency is then present at the output of the voltage-controlled oscillator. Both frequencies, the actual frequency and the averaged frequency, are compared with one another in the second phase comparison device 45. It is thus ascertained whether the actual frequency is larger or smaller than the average frequency. If the phase spacing is shorter, in the case of an increasing actual frequency, then a signal is generated at the output of the second phase comparison device which influences the switching device 47 in such a way that the connection is furnished between the timing circuit 44 and the adding circuit 48. In this case, an amount $\Delta \alpha$ is added to the phase spacing of the actual pulse train, and the actual frequency is thus reduced. However, if the actual frequency drops relative to the average frequency, then no correction takes place. Because brief increases in rpm from one cycle to another of the engine are particularly noticeable at low rpm and constant operation, being perceived as jerking, a correction of the kind described is already sufficient.

Figure 5:
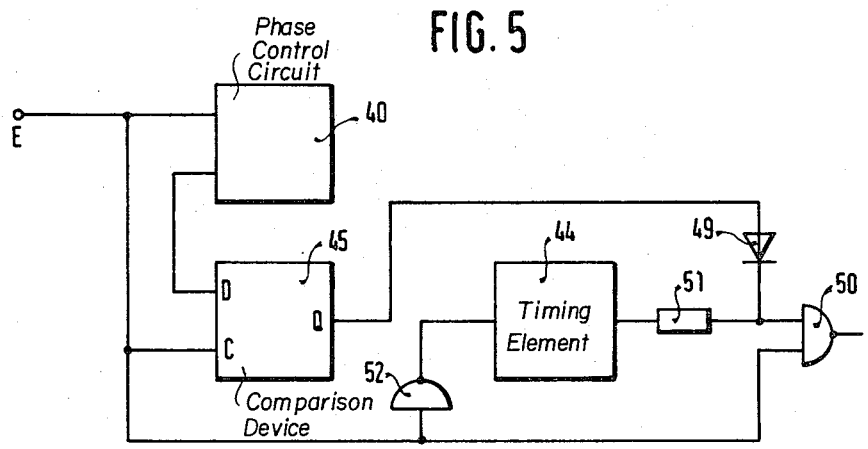
FIG. 5 is a realized circuit of the second exemplary embodiment.

In FIG. 5, a detailed embodiment is shown. Here, the input of the circuit is connected with the phase control circuit 40, which is shown simplified fashion, and the output of the voltage-controlled oscillator of the control circuit is carried to the D input of a F flip-flop. The D flip-flop serves as the second comparator device 45 and its clock input C is connected with the input E. The output Q of the flip flop leads via diode 49 to the first input of a NAND gate 50, whose other input is also connected to input E of the circuit. A timing circuit 44 is also provided, which may be a multivibrator, for example, whose input is connected via an inverter 52 with the input E of the circuit. The output of the timing circuit 44 leads via a resistor 51 to the cathode of the diode 49 and thus to the first input of the NAND fate 50.

With the aid of the pulse diagrams of FIG. 6, the mode of operation of the embodiment of FIG. 5 will now be described.

Figure 6:
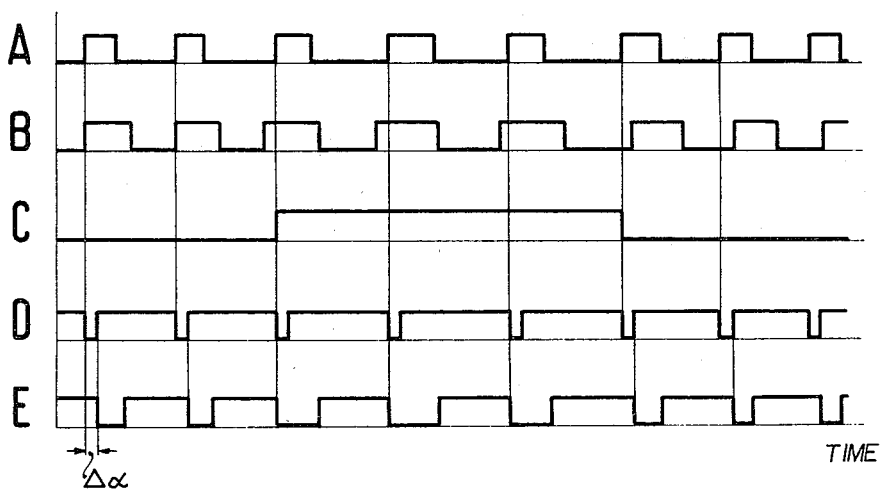
FIG. 6 gives associated pulse diagrams for the functional stages of the exemplary embodiment according to FIG. 5.

A pulse train according to Diagram A of FIG. 6 is present at input E of the circuit. The same pulse train is thus present at the clock input C of the D flip-flop 45. At input D of the D flip-flop, a pulse train arriving from the voltage-controlled oscillator of the phase control circuit 40 is present, as shown in FIG. 6B. In the D flip-flop the two signals are compared with one another, so that a signal form is present at output Q in accordance with Diagram C of FIG. 6, and this signal form is applied via the diode 49 to the first input of the NAND gate 50. Depending on the embodiment of the timing circuit 44, a negative pulse having a pulse duration of $\Delta \alpha$ is emitted at the output of the timing circuit, being triggered by the first edge of each of the ignition control pulses, and is carried via the resistor 51 to the first input of the NAND gate. The diode 49, in combination with the resistor 51, represents a logic connection taking the form of an OR gate. It a signal "1" is present at output Q of the D flip-flop, then this is furnished to the input of the NAND gate, independently of the output signal of the timing circuit 44. If in contrast the output signal at Q is "0" and the output signal of the timing circuit is "1", then this signal is effective at the NAND gate 50. The output signal of the timing circuit is shown in Diagram D of FIG. 6. The signal train E then shows the output signal at the NAND gate, which serves the purpose of controlling the ignition device. It can be seen that as long at the output Q of the D flip-flop 45 is "0", the spacing of the following ignition control pulse is prolonged by the amount of $\Delta\alpha$. Contrarily, with an output signal "1" at Q, the ignition spacing is shortened by the amount of $\Delta\alpha$. Now if the control pulse train is shifted as a whole by $\frac{1}{2}\Delta\alpha$, with the aid of a basis adjustment, the instant of ignition can be varied by the circuit described above by the amount $\pm\frac{1}{2}\Delta\alpha$. Thus, similarly to the manner described in connected with the first exemplary embodiment, so-called jerking at constant rpm when the engine is being operated in the vicinity of idling can be prevented with very simple means.

What is claimed and desired to be secured by Letters Patent of the United States is:

1. An apparatus for varying the spacing of sequential ignition control pulses emitted by an ignition pulse transducer, comprising:
    a converter receiving the sequential ignition control pulses emitted, for generating a voltage proportional to the phase difference of the sequential ignition control pulses;
    a shift memory device connected to the converter and receiving the sequential ignition control pulses emitted, said shift memory device having at least two storage locations for storing information derived from the converter;
    a comparator device connected to the storage locations of the shift memory device, for ascertaining changes in the phase difference between successive pulses of the emitted ignition control pulses by comparing the information stored in the storage locations;
    a limiting circuit connected to the comparator device, for establishing a maximal phase difference of successive pulses of the sequential ignition control pulses;
    a timing circuit connected to the limiting circuit and receiving the sequential ignition control pulses emitted, for generating a sequence of pulses representing the phase difference between successive pulses which results from comparing the information stored in the storage locations by the comparator device when a decrease occurs in successive phase differences; and
    an adding circuit connected to the timing circuit and receiving the sequential ignition control pulses emitted, for generating a corrected ignition control pulse train including the sequence of pulses generated by the timing circuit.

2. The apparatus as defined in claim 1, wherein the converter includes a memory and a charging-discharging device for controlling the information stored in the memory.

3. The apparatus as defined in claim 2, wherein the shift memory device has a first storage location and a second storage location, the first storage location being connected with the output of the memory of the converter, wherein the limiting circuit includes a comparator having two inputs, and wherein the apparatus further comprises:
    a threshold transducer connected to the output of the first storage location and to one input of the comparator of the limiting circuit, the other input of the comparator of the limiting circuit being connected to the output of the comparator device, the output of the threshold transducer being dependent on the ignition control pulse frequency serves as a set-point value for the limiting circuit such that the output of the comparator of the limiting circuit is limited to the set-point value.

4. The apparatus as defined in claim 3, further comprising:
    a switchover device connected to the adding circuit; and
    a control device connected to the switchover device wherein the output from the adding circuit can be replaced by the switchover device to the ignition control pulses emitted by the ignition pulse transducer.

5. The apparatus as defined in claim 4, wherein the control device includes a comparator whose first input is exposed to a reference value for a given rpm change and whose other input is exposed to an actual rpm change signal.

6. The apparatus as defined in claim 3, further comprising:
    an amplifier connected between the comparator device and the comparator of the limiting circuit.

7. The apparatus as defined in claim 6, wherein the amplification factor of the amplifier is variable in accordance with operating parameters.

8. The apparatus as defined in claim 3, wherein the timing circuit includes: a memory, a charging-discharging device for controlling the information stored in the memory; a multivibrator whose output controls the charging-discharging device; and a comparator connected to the memory, the limiting circuit, the reset input of the multivibrator for comparing the information stored in the memory with the output of the limiting circuit, and the adding circuit.

9. The apparatus as defined in claim 8, wherein the adding circuit comprises an AND gate, the output of which delivers the corrected ignition control pulse train.

10. The apparatus as defined in claim 8, wherein the adding circuit comprises a NAND gate, the output of which delivers the corrected ignition control pulse train.

11. The apparatus as defined in claim 2, wherein the shift memory device has a first storage location and a second storage location, and further has a low-pass filter between the two storage locations for forming an average value of the information stored in the first storage location.

12. The apparatus as defined in claim 11, wherein the first storage location is connected with the output of the memory of the converter, wherein the limiting circuit includes a comparator having two inputs, and wherein the apparatus further comprises:
    a threshold transducer connected to the output of the first storage location and to one input of the comparator of the limiting circuit, the other input of the comparator of the limiting circuit being connected to the output of the comparator device, the output of the threshold transducer being dependent on the ignition control pulse frequency serves as a set-point value for the limiting circuit such that the output of the comparator of the limiting circuit is limited to the set-point value.

13. The apparatus as defined in claim 12, further comprising:

an amplifier connected between the comparator device and the comparator of the limiting circuit.

14. The apparatus as defined in claim 13 wherein the amplification factor of the amplifier is variable in accordance with operating parameters.

15. The apparatus as defined in claim 12, wherein the timing circuit includes: a memory, a charging-discharging device for controlling the information stored in the memory; a multivibrator whose output controls the charging-discharging device; and a comparator connected to the memory, the limiting circuit, the reset input of the multivibrator for comparing the information stored in the memory with the output of the limiting circuit, and the adding circuit.

16. The apparatus as defined in claim 15, wherein the adding circuit comprises an AND gate, the output of which delivers the corrected ignition control pulse train.

17. The apparatus as defined in claim 16 wherein the adding circuit comprises NAND gate, the output of which delivers the corrected ignition control pulse train.

18. The apparatus as defined in claim 12 further comprising:
- a switchover device connected to the adding circuit; and
- a control device connected to the switchover device wherein the output from the adding circuit can be replaced by the switchover device to the ignition control pulses emitted by the ignition pulse transducer 19. The apparatus as defined in claim 18, wherein the control device includes a comparator whose first input is exposed to a reference value for a given rpm change and whose other input is exposed to an actual rpm change signal.

* * * * *